United States Patent [19]

Ibuki et al.

[11] Patent Number: 4,771,080

[45] Date of Patent: Sep. 13, 1988

[54] EXPANDABLE VINYLIDENE CHLORIDE COMPOSITION AND FOAM THEREFROM

[75] Inventors: Ichiro Ibuki, Nobeoka; Akira Fujie; Nobuo Miura, both of Suzuka, all of Japan

[73] Assignee: Asahi Kasei Kogyo Kabushiki Kaisha, Osaka, Japan

[21] Appl. No.: 137,641

[22] Filed: Dec. 24, 1987

[30] Foreign Application Priority Data

Jan. 6, 1987 [JP] Japan ............................... 62-943
Jan. 7, 1987 [JP] Japan ............................... 62-1526
Jan. 9, 1987 [JP] Japan ............................... 62-1703

[51] Int. Cl.$^4$ ................................................ C08J 9/16
[52] U.S. Cl. ..................................... 521/56; 521/60; 521/145
[58] Field of Search ........................... 521/56, 60, 145

[56] References Cited

U.S. PATENT DOCUMENTS

| | | | |
|---|---|---|---|
| 3,891,598 | 6/1975 | Marzoff | 523/204 |
| 3,960,770 | 6/1976 | Raley, Jr. et al. | 521/77 |
| 3,983,080 | 9/1976 | Suh et al. | 521/79 |
| 4,360,612 | 11/1982 | Trumbull et al. | 524/161 |
| 4,451,632 | 5/1984 | Gibbs et al. | 524/559 |
| 4,550,003 | 10/1985 | Sakata et al. | 521/145 |
| 4,689,355 | 8/1987 | Treptow et al. | 521/145 |

*Primary Examiner*—Morton Foelak
*Attorney, Agent, or Firm*—Armstrong, Nikaido, Marmelstein & Kubovcik

[57] ABSTRACT

There is disclosed expandable vinylidene chloride-based resin particles comprising 100 parts by weight of a non-crystalline vinylidene chloride-based resin composition and 1 to 40 parts by weight of a volatile organic blowing agent or a composition thereof, said resin composition consisting of a tetrahydrofuran-soluble component [A] which is a random copolymer having a weight-average molecular weight of 10,000 to 600,000 and constituted of different units represented severally by the following general formulae

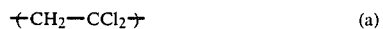 (a)

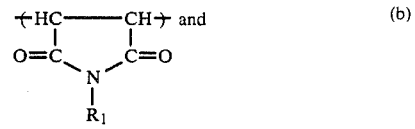

(b)

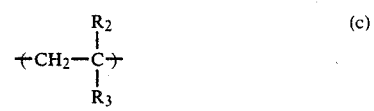

(c)

wherein; $R_1$ denotes alkyl of 1 to 4 carbon atoms, cyclohexyl, phenyl, or

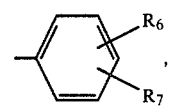

, each of $R_6$ and $R_7$ being —$CH_3$, —$C_2H_5$, —Cl, —Br, —$OCH_3$, or —H; each of $R_2$ and $R_4$ denotes —H or —$CH_3$; $R_3$ denotes halogen, —CN,

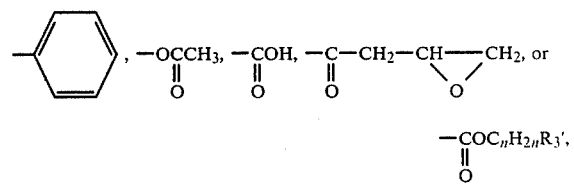

n being an integer 1 to 8 and $R_3'$ being —H or —OH; a tetrahydrofuran-insoluble component [B] which is a random copolymer constituted of different units represented severally by the general formula (a), (b), and (c) and the following general formula (Abstract continued on next page.)

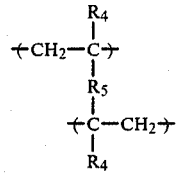

wherein; (a), (b), (c), $R_1$, $R_2$, $R_3$, $R_4$, $R_6$ and $R_7$ are defined as above and $R_5$ denotes phenylene,

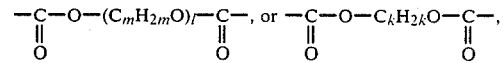

m being an integer of 2 to 3, l being an integer of 2 to 5, and k being an integer of 2 to 6;

the proportions of components [A] and [B] satisfying the conditions:

[A]+[B]=100% by weight

[A]≧20% by weight and said resin composition having a glass transition temperature of at least 85° C., and foams produced therefrom.

17 Claims, 6 Drawing Sheets

EXPANDABLE VINYLIDENE CHLORIDE COMPOSITION AND FOAM THEREFROM

BACKGROUND OF THE INVENTION

1. Field of the Invention

The present invention relates to expandable resin particles consisting mainly of a vinylidene chloride copolymer composition, which is superior in heat resistance, flame resistance, and high-temperature mechanical properties and has gas impermeability and chemical resistance, and to vinylidene chloride-based resin foams superior in heat resistance expanded and shaped in molds from pre-expanded particles which are prepared from said expandable particles. More particularly, the invention relates to foams improved in resistance to thermal deformation, which are expanded and shaped in molds from a non-crystalline vinylidene chloride-based resin composition, having a high glass transition temperature, that is, to molded cellular structures of a novel vinylidene chloride-based resin which are fitted particularly suitable for use as heat insulators and cushioning materials. In addition, the invention relates to expandable particles and pre-expanded particles for the production of said molded foams and to a process for producing those expandable and pre-expanded particles.

2. Description of the Prior Art

Vinylidene chloride copolymers are generally classified into a crystalline group having a crystal structure and a non-crystalline group not having a crystal structure.

The crystalline copolymers contain more than 85 mole % of vinylidene chloride units. Taking full advantage of their superior characteristics including flame resistance, gas impermeability, and chemical resistance, these crystalline copolymers are processed to form products by methods such as melt extrusion, coating in the form of solutions in solvents, coating in the form of aqueous dispersions, and molding in the form of blends with other resins, and are used as fibers, food packaging films, tubes, and cups, etc. However, the crystalline nature of these copolymers, while providing such superior characteristics, is chiefly responsible for problems such as; difficulties in controlling dimensional stability when they are melt-extruded and formed into films; the difficulty of melting them in melt extrusion thereof; the difficulty of dissolving them in solvents to prepare coating solutions and the short life of these solutions; and the short life of aqueous dispersions thereof for coating purposes.

A number of attempts or proposals were made to solve such problems. For instance, an attempt was made to improve extrusion processability by using a plasticizer, but this has been found to bring about adverse effects such that the plasticizer, specially in films may migrate to the film surfaces and contaminate wrapped foods, and that the plasticizer may markedly deteriorate the gas impermeability that is an important characteristic of crystalline vinylidene chloride copolymers.

On the other hand, some attempts were made to reduce the crystallinity that is the main factor causing the above-mentioned problems or to make them amorphous, but it could not be expected using that approach to solve those problems without sacrificing gas impermeability, flame resistance, chemical resistance, and/or heat resistance.

Meanwhile, there have been used synthetic resin foams which have fine uniform closed cells and which are superior in heat insulating properties and cushioning properties, for various purposes according to characteristics that the individual base resins have. In recent years, the practical applications of such foams have drawn attention and this has prompted active studies which are for the purpose of improving the properties synthetic resins, whereby foams of various synthetic resins have become available and techniques of foam processing have been advanced to a great extent. Under such circumstances, there has been a need for foams of a resin constituted mainly of vinylidene chloride which take full advantage of the excellent properties, e.g. the high gas impermeability and flame resistance, of such a resin. Nevertheless, such foams have not yet been developed up to now.

The generally accepted reason for this is that conventional resins constituted mainly of vinylidene chloride have the following drawbacks:

(1) Since the melt-processing temperature of the resin is in close proximity to the decomposition temperature thereof, the resin is liable to decompose in the step of extruding it.

(2) The low permeability of the resin makes it difficult to impregnate the resin with blowing agents.

(3) Since the viscoelasticity of the resin depends greatly upon temperature in the vicinity of the foaming temperature, it is difficult to optimize foaming conditions.

Thus, there have been great difficulties in the production of good, homogeneous, highly-expanded foams from such a resin without decomposing it.

It is already well known how to produce a non-crystalline vinylidene chloride copolymer. This can be accomplished generally by copolymerization under such conditions that the content of vinylidene chloride units in the resulting copolymer is less than 85 mole %.

As an example, Japanese Patent Application Laid-Open No. 44510/85 proposes a non-crystalline vinylidene chloride copolymer for the purpose of solving problems caused by the crystalline nature of vinylidene chloride copolymers. This patent application discloses examples in which copolymers resulting from the copolymerization of vinylidene chloride with methyl acrylate in molar ratios of 47:53 to 81:19 could be melt-extruded and formed into films without adding any plasticizer. However, these copolymers, having low glass transition temperatures, resulted in films or foams having low stiffness at elevated temperatures, hence exhibiting poor resistance to thermal deformation and being insufficient in chemical resistance and flame resistance.

On the other hand, Japanese Patent Publication No. 9551/66 discloses a technique different essentially in technical philosophy from the present invention. The disclosed technique involves processes for producing a copolymer of vinyl chloride with an N-substituted maleimide and for producing a copolymer of these monomers and additionally an ethylenic unsaturated monomer, for the purpose of raising the heat softening temperature of vinyl chloride polymers. That is, it is an object of the technique disclosed in said patent publication to provide vinyl chloride copolymers improved in heat resistance which comprise vinyl chloride and an N-substituted maleimide as essential constituents and, if necessary, an ethylenic unsaturated monomer including vinylidene chloride. Suitable compositions of the copolymer for achieving the above object are disclosed to be 60–90% by weight of vinyl chloride, 1–40% weight of an N-substituted maleimide, and 0–20% by weight of an ethylenic unsaturated monomer. Further, said patent publication teaches that the softening temperature of the homopolymer of said ethylenic unsaturated monomer should be equal or higher than the softening temperature of polyvinyl chloride. That is to say, copolymers of vinylidene chloride are naturally eliminated from the scope of the invention disclosed in this patent since the glass transition temperature of the vinylidene chloride homopolymer is as low as −18° C. Thus, the invention of said patent publication does not suggest the technical philosophy of the present invention, that is, the heat resistance of a vinylidene chloride-based polymer is enhanced while maintaining the high gas impermeability and chemical resistance of this polymer.

Also, Japanese Patent Publication No. 22211/71 discloses a process for producing copolymers constituted of 40–90 mole % of acrylonitrile, 1–10 mole % of an N-substituted maleimide, and 10–50 mole % of at least one ethylenic unsaturated monomer except olefinic hydrocarbons.

The philosophy of the technique disclosed in said published patent application relates to a process for producing acrylonitrile copolymers having improved heat resistance and moldability and does not include a process for producing any copolymer improved in flame resistance and gas impermeability. Even though vinylidene chloride is given as an example of the ethylenic unsaturated monomer, the amount of vinylidene chloride used is limited to a low level. Thus, said published patent application does not suggest of expandable particles of vinylidene chloride copolymers, vinylidene chloride copolymer compositions combining heat resistance, flame resistance, gas impermeability, expandability, and expansion-moldability, or processes for producing such expandable particles or for producing such compositions.

As regards the prior art foam processing of vinylidene chloride-based resins, there are proposed foams produced by extrusion-expansion using specially selected chemical blowing agents (Japanese patent publication Nos. 3968/64 and 16419/67, U.S. Pat. No. 2,948,048, etc.). However, the expansion ratio of these foams are as low as 2 to 3-fold, this cross section is small in size as represented by that of artificial bamboo blind, artificial bamboo blind cores, and ornamental yarns, etc. The purposes of expansion are only for controlling the surface gloss and for imparting flexibility.

A high-expansion technique using physical blowing agents is also known which comprises mixing a finely divided vinylidene chloride-based resin with a physical blowing agent, and extruding and expanding the mixture at relatively low temperatures (about 120–150° C.), thereby yielding foams having densities of about 240 kg/m³ and higher and cell sizes of about 0.1–1 mm (U.S. Pat. No. 3,983,080). However, these foams are produced from a base resin which shows an X-ray diffraction pattern characteristic of a crystal structure, as disclosed in said patent specification, and hence the resin is difficult to impregnate with the blowing agent and can be impregnated only with a limited amount of blowing agent. Moreover, since the viscoelasticity of the resin melt is not particularly suited for expansion, only foams of relatively high densities, as shown above, can be produced. Furthermore, in this process, the blowing agent with which the resin has been impregnated does not exhibit sufficient expanding effect, thermal decomposition of the blowing agent is difficult to control evenly, and thermal decomposition of the resin results. Hence, extrusion and expansion cannot be continued for enough time and the extruded foam is in string form and has an uneven surface and markedly nonuniform cell sizes.

On the other hand, there are proposed spherical expandable thermoplastic copolymer particles of a single-cell type which have a diameter of about 1–50 μm and contain a volatile liquid blowing agent (Japanese Patent Publication No. 26524/67, Japanese Patent Application Laid-Open No. 59168/74, GBA2,025,429, GB1,588,148, GB1,412,857, GB1,422,827, and EP112,807). The thermoplastic copolymers defined in these patent specifications include a vinylidene chloride-acrylonitrile copolymer and a vinylidene chloride-butyl acrylate copolymer, and some examples in the specifications describe that said particles, when heated to expand and fuse together, form a foam-like structure. However, the inventions disclosed in these patents are quite different from the present invention in the principle of expansion, the structure of expandable particles, the structure and performance characteristics of foam, and hence applications for the foam. Therefore, technical differences between each of these patented inventions and the present invention are rated below to clarify the distinction between them.

The greatest technical difference is as follows: According to the present invention, which is described later in detail, multicellular resin particles having high recovery and resilience are obtained by impregnating resin particles with a blowing agent (dissolved therein), and the formation of an aggregate of these multicellular particles is accomplished by the technique of shaping in a mold, whereby it is possible to obtain a foam having a high proportion of closed cells and superior mechanical strength. In contrast, the expandable resin particles of the above patented inventions are fine balloon-like structures, i.e. so-called micro-balloons, containing a liquid blowing agent and hence the expansion and fusion of these expandable particles by heating results in an aggregate consisting of single-cell balloon-like particle units which have a low proportion of closed cells and also inferior mechanical strength. Moreover, these particles in micro-balloon form are used in mixtures with inks or paints chiefly to form three-dimensional patterns on wall papers and the like, and since these particles have a very small size of 1–50 μm, as stated above, the shaping of them in a mold, when tried, raises problems such that they cannot be uniformly filled in the mold and steam cannot penetrate sufficiently into the molding. Thus, these particles are different fundamentally from the expandable particles of the present invention in that an aggregate cannot be produced from the former particles by expansion and shaping in a mold, this operation being an object of the present invention.

In contrast to the above described prior art, the present inventors previously proposed multicellular foams produced by the technique of expanding and shaping a non-crystalline vinylidene chloride copolymer in molds, said copolymer being constituted of at least 10% of vinylidene chloride and at least one of other monomers copolymerizable therewith, such as styrene, vinyl acetate, vinyl chloride, acrylonitrile, methacrylonitrile, acrylic acid, methacrylic acid, methyl acrylate, ethyl acrylate, methyl methacrylate, ethyl methacrylate, ethylene, methylpropylene, and methylbutene. In particular, the inventors have found that copolymers of vinylidene chloride with acrylic monomers, above all, are preferable for producing a highly expanded foam. This technique is described in detail in the specification of U.S. Pat. No. 4,613,626.

Based on this technique, high-performance insulating panels have been developed which enjoy the full benefit of high gas impermeability and flame resistance characteristic of vinylidene chloride-based resins. However, since these vinylidene chloride copolymers have low glass transition temperatures, the gas contained in the cells of foams produced from these copolymers expands or contracts with variations in the ambient temperature, causing variations in the dimensions of the foams, and these variations may cause permanent deformation. Particularly at high atmospheric temperatures, there is the significant problem of the secondary expansion due to these temperatures, which tends to cause marked deformation of these foams. In consequence, the applications of these foams are restricted in spite of the superior heat insulating property thereof.

In addition, when the methyl methacrylate content in a vinylidene chloride-methyl methacrylate copolymer, as an example, is increased for the purpose of enhancing the resistance to thermal deformation, this will deteriorate the flame resistance and gas impermeability of the resulting foam characteristic of vinylidene chloride-based resins. Further, it will become impossible to hold Freon gas, which has low thermal conductivity, in the cells over a long term, thus deteriorating the heat insulating property.

That is to say, it is not yet achieved to develop vinylidene chloride-based resin foams of high performance that combine the characteristics of low thermal conductivity, high heat resistance, and high flame resistance.

SUMMARY OF THE INVENTION

It is an object of the present invention to provide foams of a novel vinylidene chloride copolymer which have such improved dimensional stability to heat as has not been achieved up to now with conventional vinylidene chloride-based resin foams, said vinylidene chloride copolymer being superior in resistance to thermal deformation and flame resistance, retaining such characteristics of conventional vinylidene chloride copolymers as gas impermeability and chemical resistance, yet having none of the above-mentioned drawbacks of crystalline vinylidene chloride copolymers, and having a glass transition temperature of at least 85° C. In other words, this object is to provide heat-insulating foams which have many practical applications and a variety of uses, by making it possible to use such foams as heat insulating panels and the like over a wide temperature range from low to high temperatures.

It is another object of the invention to provide heat-insulating purpose foams which have superior properties, for example, the capability to retain their low thermal conductivity for a long period of time and which are dimensionally stable even though the surrounding temperature changes, and additionally have good flame resistance, by using a vinylidene chloride copolymer improved in heat resistance without impairing any of characteristics, e.g. gas impermeability, flame resistance, chemical resistance, and mechanical strength, which vinylidene chloride-based resins have inherently.

The improvement in heat resistance should not lower the resistance to thermal decomposition or the ability to be impregnated with any suitable blowing agent and should not adversely modify the change of the viscoelasticity of the resin with temperature in the vicinity of the foaming temperature. Any characteristic of the resin that is necessary to produce the foams for achieving the above objects should not be inferior to a certain level, for example, the level disclosed in U.S. Pat. No. 4,613,626.

Under such circumstances, the present inventors made intensive studies and as a result have accomplished the present invention. That is, the objects of the invention can be achieved by (i) expandable vinylidene chloride-based resin particles comprising 100 parts by weight of a non-crystalline vinylidene chloride-based resin composition and 1 to 40 parts by weight of a volatile organic blowing agent, said resin composition consisting of a tetrahydrofuran-soluble component [A] which is a random copolymer having a weight-average molecular weight of 10,000 to 600,000 and constituted of different units represented severally by the following general formulae

  (a)

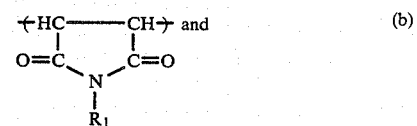 and  (b)

  (c)

wherein $R_1$ denotes alkyl of 1 to 4 carbon atoms, cyclohexyl, phenyl, or

, each of $R_6$ and $R_7$ being —CH$_3$, —C$_2$H$_5$, —Cl, —Br, —OCH$_3$, or -H; each of $R_2$ and $R_4$ denotes —H or —CH$_3$; $R_3$ denotes halogen, —CN,

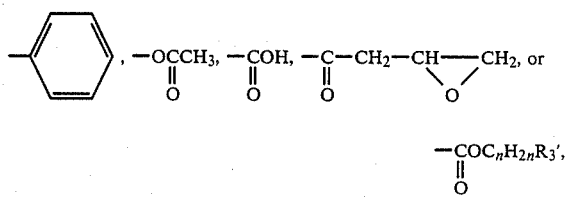

n being an integer of 1 to 8 and $R_3'$ being —H or —OH;

a tetrahydrofuran-insoluble component [B] which is a random coolymer constituted of different units represented severally by the general formulae (a), (b), and (c) and the following general formula

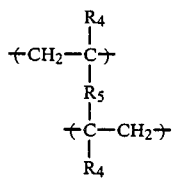

(d)

wherein; (a), (b), (c), $R_1$, $R_2$, $R_3$, $R_4$, $R_6$ and $R_7$ are defined as above
and $R_5$ denotes phenylene,

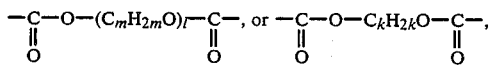

m being an integer of 2 to 3, l being an integer of 2 to 5, and k being an integer of 2 to 6;
the proportions of components [A] and [B] satisfying the conditions:
[A]+[B]=100% by weight
[A]≧20% by weight
and said resin composition having a glass transition temperature of at least 85° C., and (ii) vinylidene chloride-based resin foams which are produced from said expandable particles by expanding and shaping them in molds and which have a structure in which numerous multicellular particles of said resin are in intimate contact with neighboring particles of and are fused together.

Essential matters of the invention are the adoptions of the following:

(1) A non-crystalline, multi-constituent copolymer base resin, which is a vinylidene chloride-based resin composition, as stated above, superior in resistance to thermal deformation and having a high glass transition temperature.

(2) In particular, a non-crystalline vinylidene chloride-based resin exhibiting an elongation (at break) exceeding 200% at a temperature between its glass transition temperature (Tg) and Tg+50° C., preferably a similar resin in which the tetrahydrofuran-insoluble fraction is adjusted to a content of 10 to 80% by introducing a suitable amount of crosslinking constitutional unit (d) into the resin.

(3) Multicellular pre-expanded particles having closed cells in a proportion of at least 60% based on the total volume of open and closed cells, said beads being prepared by impregnating the base resin with a volatile organic blowing agent and heating the impregnated resin particles.

(4) Further, the method of bringing resin particles having a uniform particle size distribution into contact with a volatile organic blowing agent to impregnate the particles therewith.

DETAILED DESCRIPTION OF PREFERRED EMBODIMENTS

The above essential matter (1) is a basis of the present invention, since it is a matter of course that the thermal-deformation resistance of the base resin needs to be enhanced in order to raise the heat stability of the dimension of the molded foam that is a final product.

Figure 3:
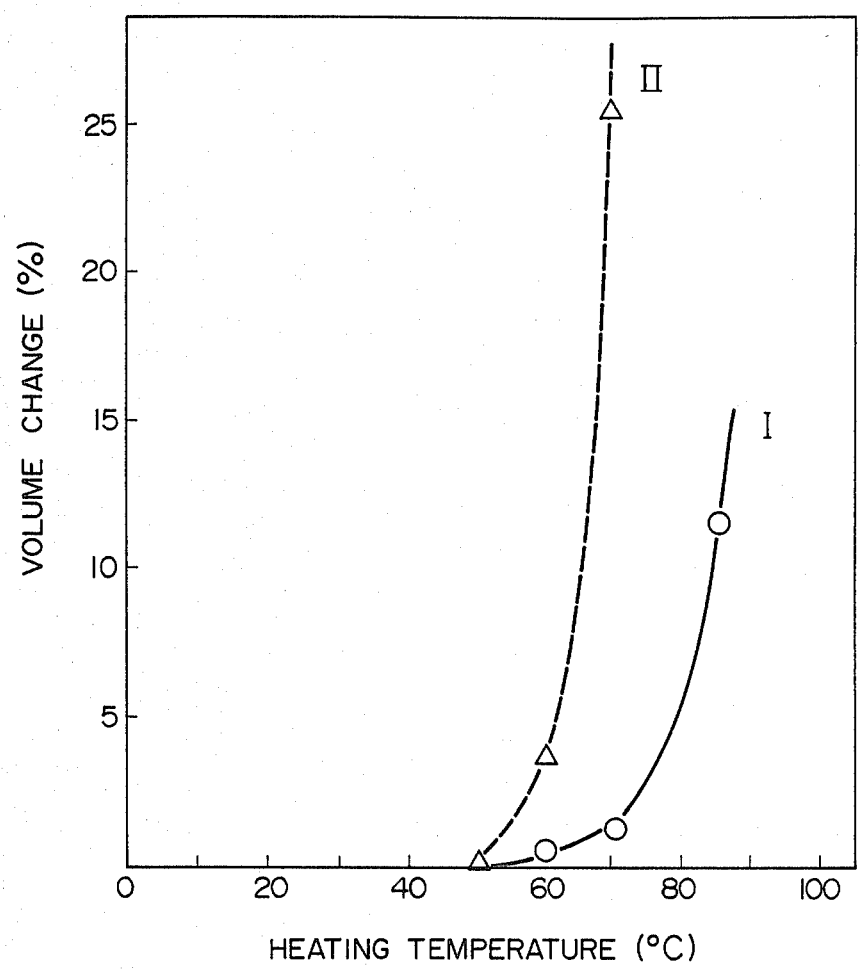
FIG. 3 is a graph showing the relationship between volume change (%) and heating temperature for a molded foam according to the invention (curve I) and for a foam molded from a conventional vinylidene chloride-based resin (curve II).

As shown in FIG. 3, the percentage of volume change at high temperatures (curve I) of a foam molded from the base resin of the present invention, that is, an N-substituted maleimide-containing, non-crystalline vinylidene chloride-based resin composition improved in thermal-deformation resistance (Tg:96° C.), is smaller than that (curve II) of a foam molded from the same vinylidene chloride based resin (Tg:71° C.) as disclosed in Japanese Patent Application Laid-Open No. 125649/83. Hence, it is clear that the molded foam of the present invention retains dimensional stability up to a higher temperature than does the latter foam, that is to say, it is clear that the molded foam of the invention has been improved in thermal-deformation resistance without impairing flame resistance characteristic of vinylidene chloride-based resins.

The flame resistance of a molded foam, in the present invention, means that the self-extinguishing property of the foam meets the requirements prescribed in JIS A9511. In order to satisfy said requirements, a base resin which forms such a molded foam needs to exhibit a limiting oxygen index of at least 24 in accordance with JIS K7201. Referring to properties of base resins, that is, the glass transition temperature, below which the micro-Brownian movement is frozen, and the limiting oxygen index, which is a measure of flame resistance, the base resin of the present invention exhibits a Tg of 96° C. and a limiting oxygen index of 32% while the prior art base resin exhibits a Tg of 71° C. and a limiting oxygen index of 23%. It is evident that the above object of the invention is achieved by the essential matter (1).

Thus, it may be seen that the copolymerization of an N-substituted maleimide, a small content of which is effective in enhancing thermal-deformation resistance, is important in the present invention in order to raise the glass transition temperature of the base resin without impairing beneficial characteristics of vinylidene chloride-based resins. As to the dimensional stability to heat of the molded foam of the invention, the percentage of volume change at 70° C. can be depressed to 5% or less.

The necessity of the essential matter (2) is explained below in connection with the high proportion of closed cells in the foam molded from expandable resin particles of the present invention. Generally, the process for foaming a thermoplastic resin comprises heating the resin containing a blowing agent to a softened fluid state and develop numerous discrete cells under the pressure of the gas evolved from the blowing agent. The viscoelastic behavior of the resin at processing temperatures is very important, that is, when the elastic modulus of a softened resin is excessively high, foams of high expansion ratios are difficult to obtain and when viscous flow of a softened resin is dominant, discrete cells are difficult to obtain, resulting in open cells for the most part. This is well known by those skilled in the art.

As a result of analyzing the tensile behavior of base resins at high temperatures, the present inventors have found that a resin exhibit an elongation exceeding 200% at a temperature within the range of from the glass transition temperature (Tg) of the resin to (Tg+50)° C. is favorable for the purpose of producing foams of high closed cell proportions. For instance, resins of Run Nos. 4, 5, and 6 of Table 6, given later, have Tg's of 96°, 80°, and 90° C., respectively and exhibit elongations at (Tg+25)° C. of 380% (120° C.), 50% (105° C.), and 680% (115° C.). Foams prepared from hese resins by expanding them at the same degree of expansion have closed cell proportions of 60%, 35%, and 72%, respectively. Even a molded foam cannot be obtained from a resin which exhibits such a low elongation as 50% under said conditions. From the fact that the proportion of closed cells increases with an increase in elongation, it can be seen that a high elongation of the softened base resin is a desirable condition for molding foams having closed cell proportions of 60% and more. For the purpose of producing closed-cell foams of high expansion ratios, it is very favorable to introduce a partly crosslinked structure to modify high-temperature viscoelastic properties of the base resin. The introduction of a partly crosslinked structure can be achieved by copolymerizing a crosslinking compound represented by the general formula (d) which becomes a constituent of the component [B] of the copolymer composition as mentioned above. It is desirable to prepare a non-crystalline crosslinked vinylidene chloride copolymer having a glass transition temperature of at least 85° C. and a tetrahydrofuran-insoluble fraction (component [B] content) of 10 to 80%. When the glass transition temperature is lower than 85° C., the resulting molded foam shows low dimensional stability at high temperatures and hence the object of the present invention cannot be achieved.

The ratio of the tetrahydrofuran-soluble component [A] to the tetrahydrofuran-insoluble component [B] in the copolymer composition should be chosen depending upon the end uses and expansion ratio of the molded foam. In general, copolymer compositions of 0-80% component (B) content can be used. When the intended expansion ratio is less than 10, the content of component [B] does not effect the proportion of closed-cells. When the expansion ratio exceeds 10, copolymer compositions of less than 10% component [B] tend to provide multicellular pre-expanded particles having less than 80% of closed cells. Such copolymer compositions are unsatisfactory in melt viscoelasticity at high temperatures. On the contrary, when the content of component [B] exceeds 80%, the expansion ratio decreases undesirably. The viscoelastic behavior appropriate for foaming can be controlled by introducing a crosslinked structure so that the content of component [B] falls within a prescribed range. In particular, when foaming is conducted at a high expansion ratio, an appropriate melt viscoelasticity needs to be imparted. For the purpose of preventing the puncture of cell walls in the expansion step, the content of component [B] is desirably from 10 to 80%, preferably from 30 to 70%.

When pre-expanded particles prepared from a crosslinked base resin, molded foams abundant in closed cells and superior in compression strength and in heat insulating properties can be obtained in high yield with good shapeability in molds. Moreover, molded foams in this case are superior in the heat stability of dimensions to molded foams produced from base resins having no crosslinking.

The necessity of the essential matter (3) is explained below in connection with the end uses of molded foams of the present invention.

The molded foams of the invention can be used for a variety of applications. Utilizing specially the gas impermeabity that is an outstanding characteristic of vinylidene chloride-based resins, a gas of low thermal conductivity such as a fluorinated hydrocarbon gas can be enclosed in the fine closed cells of the molded foams of the invention. These molded foams can retain low thermal conductivity for long peiiod of time and hence can be expected to serve as superior heat insulators. For instance, it is apparent from FIG. 4 that molded vinylidene chloride-based resin foams of the present invention (curve III) are superior as heat insulators as compared to extruded polystyrene foam (curve IV) hitherto available commercially. In order to exhibit such a superior characteristic, it is a prerequisite that the gas in the cells should not readily permeate cell walls to diffuse into the atmosphere or surrounding air. In other words, most of the cells in the foam need to be fine closed cells separated from neighboring cells by partitions acting as high gas barriers. In order to realize such molded foams, it is necessary that the raw material, multicellular pre-expanded particles should have high proportions of closed cells. When the proportion of closed cells in multicellular pre-expanded particles is low, the foams molded from these particles are inferior in heat insulating efficiency. In addition, when such particles are expanded and fused in a mold, shape reproducibility is poor and sinks and shrink are liable to develop. In an extreme case, no molded foam can be obtained. In view the above, it is concluded that the proportion of closed cells in the multicellular pre-expanded particles is desired to be at least 60%. For the purpose of providing excellent heat insulating properties, the proportion of closed cells is preferably at least 80%.

The term "multicellular" of multicellular pre-expanded particles used in the present invention means that each particle has at least several fine cells. Diameters of the multicellular pre-expanded particles are usually from 0.2 to 5 mm, the cell diameter is desirably in the range of 0.01 to 1.0 mm. When the cell diameter is less than 0.01 mm, mold shape reproducibility in expanding and shaping such particles in a mold is inferior, and sinks and shrinking are liable to develop. When the cell diameter exceeds 1.0 mm, the resulting molded foams will have a lowered mechanical strength and inferior heat insulating properties.

The necessity of the essential matter (4) is explained below in connection with processes for producing expandable resin particles. Vinylidene chloride-based resin compositions into which N-substituted maleimide units have been introduced, as in the present invention, inevitably have a low ability to solve blowing agents. However, the time required for impregnation with the blowing agent can be reduced by raising the temperature of contact as far as possible. However, since vinylidene chloride-based resins are generally liable to decompose thermally and the base resin composition of the present invention inevitably has such a tendency, the protracted exposure of the base resin to high-temperatures causes dehydrogenation and thermal degradation of the resin. As a result, the expandability of the resin impregnated with a blowing agent is markedly lowered and physical properties of the molded foam are deteriorated.

In addition, the hydrochloric acid and chlorine generated from the resin by thermal decomposition cause the corrosion of apparatus, such as pressure vessels. This is a significant problem also from the viewpoint of safety.

Therefore, it is necessary to impregnate the base resin composition with such amount of a blowing agent as to provide sufficient expandability to the resin composition while balancing the various problems stated above. The present inventors have satisfied this necessity by adjusting the diameter of base resin particles to be in the range of 0.1 to 1.0 mm and choosing the temperature (T) of impregnating the base resin with a blowing agent from the range represented by the following equation, on the basis of the glass transition temperature (Tg) of the base resin.

$$T \leq (Tg+20)° C.$$

Figure 5:
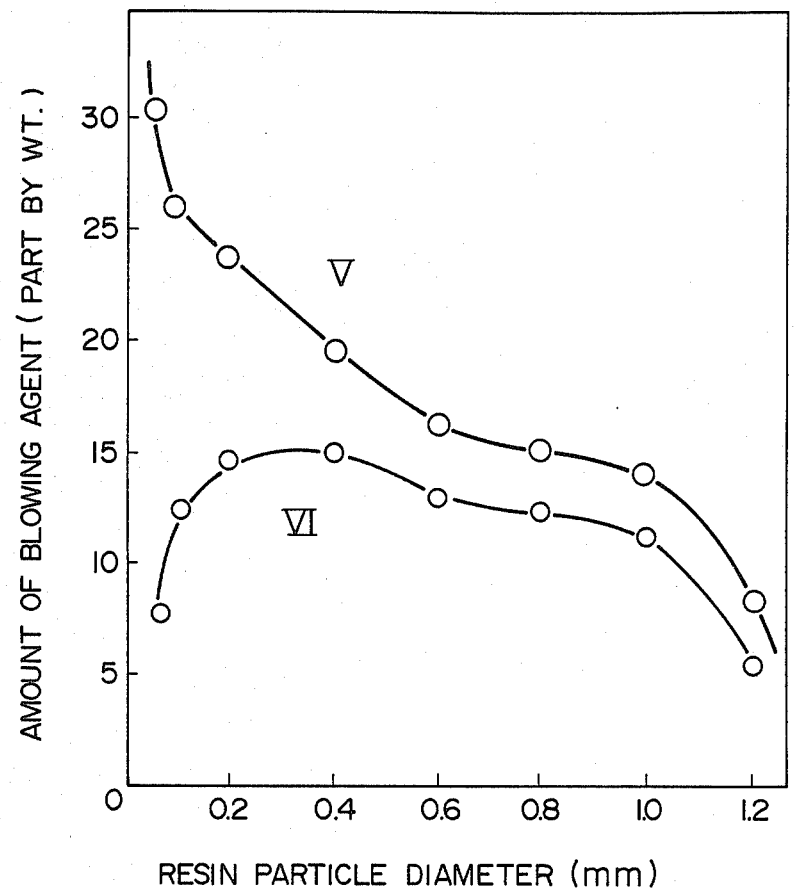
FIG. 5 is a graph showing the relationship between the amount of blowing agent absorbed and resin particle diameter when vinylidene chloride-based resin particles according to the invention are impregnated with a blowing agent. Curve V shows the relationship immediately after impregnation and curve VI shows the relation after the impregnated particles had been exposed to the atmosphere for 8 days at 32° C.

FIG. 5 shows results of impregnation tests on groups of vinylidene chloride-based resin particles of the present invention, said groups being different in particle diameter. Particles of each group were impregnated with a liquid blowing agent by immersing at 100° C. for 70 hours. Curve V shows the amounts of the blowing agent contained in the groups of particles immediately after impregnation. Curve VI shows the amounts of the blowing agent contained in the groups of particles after 8 days' exposure of these impregnated particles to the atmosphere at 32° C. As is apparent from these results, the rate of impregnation depends greatly on the diameter of resin particles. The smaller resin particles are more readily impregnated. While the relation of the impregnation rate to particle diameter is nearly linear, the relation deviates largely from linearity when the particle diameter is less than 0.1 mm and when it exceeds 1 mm. As to the ability of resin particle to keep the blowing agent therein, the blowing agent dissipates more readily from the smaller resin particles but the relation of the dissipation rate to the particle diameter is not necessarily linear. Marked dissipation of the blowing agent is clearly observed from resin particles of less than 0.1 mm in diameter. Accordingly, the diameter of resin particles is desirably from 0.1 to 1.0 mm, preferably from 0.2 to 0.6 mm. Further, when resin particles have a nonuniform particle size distribution, the resulting multicellular pre-expanded particles have a nonuniform distribution of expansion ratios. When these pre-expanded particles are used for expansion and shaping in a mold, the resulting molded foam has local variations in density. Therefore, it is desirable that the base resin used have a uniform particle size distribution.

Figure 6:
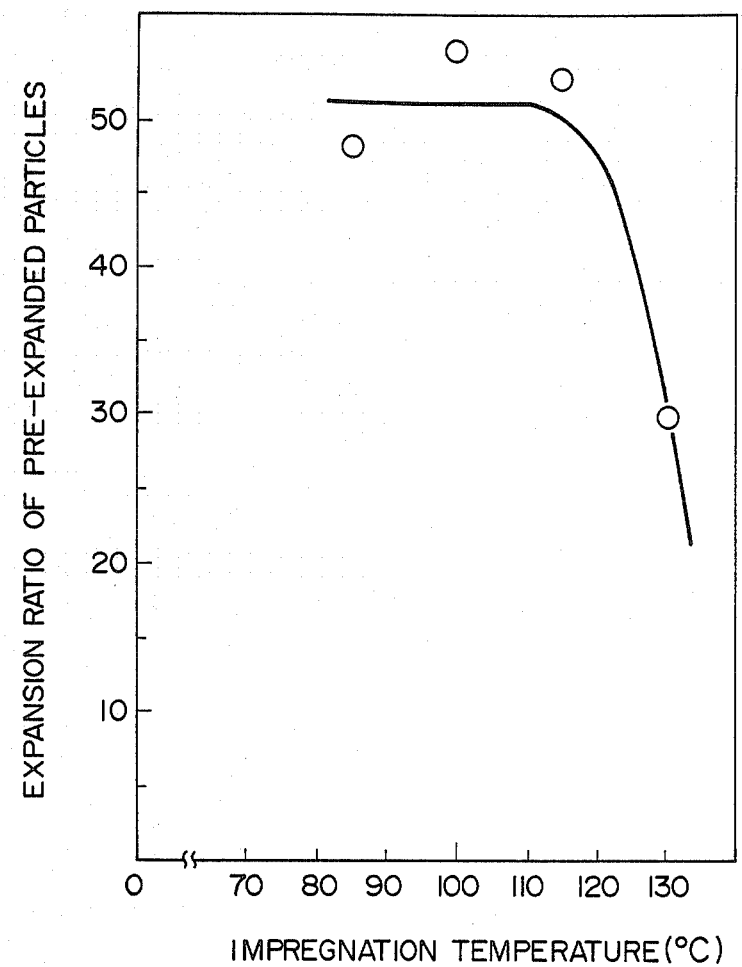
FIG. 6 is a graph showing relationship between expansion ratio and impregnation temperature when expandable resin particles according to the invention impregnated with a blowing agent are pre-expanded.

FIG. 6 shows the results of plotting expansion ratios vs. impregnation temperatures, where the expansion ratios are of the pre-expansion of groups of expandable particles which were prepared by impregnating groups of base resin particles with a blowing agent at different temperatures so that the groups of resin particles may contain the same amount of blowing agent. It is apparent from FIG. 6 that the expansion ratio decreases markedly when the impregnation temperature exceeds the glass transition temperature of the base resin +20° C. Conceivably, this is because the base resin was thermally degraded by high-temperature impregnation as stated above, hence altering largely the viscoelasticity of the resin at the temperature of heating and expansion. In order to achieve the object of the present invention, the temperature of impregnating with the blowing agent used should not exceed Tg of base resin +20° C. On the other hand, impregnation at a low temperature is uneconomical, since a prolong time required for the impregnation with a necessary amount of blowing agent. The impregnation temperature is desired to be in the range of room temperature to (Tg+20)° C. Of course, the impregnation period is suitably chosen according to the impregnation temperature and the intended expansion ratio. In general, the impregnation period is upto 200 hours, preferably upto 100 hours.

The constitutional unit (a) of the random copolymer used in the present invention results from vinylidene chloride. The constitutional unit (b) has a structure resulting from opening the double bond of —CH=CH— of an N-substituted maleimide, that is, this unit results from an N-substituted maleimide.

An example of N-substituted maleimide monomers includes N-phenylmaleimide, N-2-methylphenylmaleimide, N-2,6-dimethylphenylmaleimide, N-cyclohexylmaleimide, N-2-chlorophenylmaleimide, N-2-bromophenylmaleimide, N-2-methoxyphenylmaleimide, and N-ethylmaleimide. Of these monomers, preferred are N-phenylmaleide, N-2-methylphenylmaleimide, and N-2-chlorophenylmaleimide, which are commercially available. Above all, N-phenylmaleimide is particularly preferable.

The constitutional unit (c) has a structure resulting from opening the double bond of >C=C< of an ethylenic monomer, unsaturated carboxylic acid, or its ester. Examples of the ethylenic monomer include vinyl acetate, vinyl chloride, styrene, α-methylstyrene, acrylonitrile, and methacrylonitrile. Examples of the unsaturated carboxylic acid or its ester include acrylic acid, methacrylic acid, methyl acrylate, ethyl acrylate, butyl acrylate, methyl methacrylate, ethyl methacrylate, glycidyl methacrylate, 2-ethylhexyl acrylate, 2-ethylhexyl methacrylate, 2-hydroxyethyl acrylate, and 2-hydroxyethyl methacrylate. In the present invention, these compounds can be used alone or in combination, but the above ester monomers have tendecies to lower the flame resistance of the resulting copolymer composition, conceivably because they contain oxygen atoms in the molecule; hence the amount of these monomers used is limited when no flame retardant is used.

It is preferable to use styrene, α-methylstyrene, acrylonitrile, or methacrylonitrile because of the high glass transition temperatures of their homopolymers, and a vinylidene chloride-based resin composition having a relatively high glass transition temperature can be produced by using any of these monomers with a small amount of an N-substituted maleimide, which is comparatively expensive.

Styrene, α-methylstyrene, and methacrylonitrile have relatively-low tendencies to be copolymerized with vinylidene chloride, while acrylonitrile has a high tendency to be copolymerized with vinylidene chloride, styrene, or an N-substituted maleimide. It is particularly preferable to use styrene and acrylonitrile in combination, since this is considered to provide suitable viscoelasticity for expansion and expansion-molding at high temperatures.

Vinyl chloride tends to provide enhanced flame resistance but makes it relatively difficult to achieve a high glass transition temperature.

The constitutional unit (d) has a structure resulting from opening the double bonds of two >C=C< units of a divinyl monomer, diacrylate monomer, or dimethacrylate monomer. A typical example of the divinyl monomer is divinylbenzene. Examples of the diacrylate and dimethacrylate monomer include diacrylates and dimethacrylates, respectively, of ethylene glycol, polyethylene glycol, propylene glycol, polypropylene glycol, tetramethylene glycol, polytetramethylene glycol, neopentyl glycol, and hexamethylene glycol.

The order of combining constitutional units (a), (b), and (c) in [A] and the order of combining constitutional units (a), (b), (c), and (d) in [B] are random as controlled by a radical polymerization mechanism. Constitutional units (d) chiefly form crosslinking points of three-dimensional structure.

The glass transition temperature is measured with a differential scanning calorimeter (DSC) in accordance with ASTM D-3418-75. This transition temperature is important as a measure of the thermal-deformation resistance of a processed or molded article.

The terms "tetrahydrofuran-soluble component" (hereinafter simply referred to as soluble component) and "tetrahydrofuran-insoluble component" (hereinafter simply referred to as insoluble component) used in the present invention mean the respective copolymers obtained by immersing 1 to 2 g of a copolymer composition of the invention in 100 ml of tetrahydrofuran with stirring at 40° C. for 1 hour, filtering to separate it into soluble matter and insoluble matter, and removing tetrahydrofuran.

As the soluble component content in the copolymer composition of the invention is increased, the melt fluidity of the composition increases. As the insoluble component content, on the contrary, is increased, the tensile strength of the copolymer composition at high temperature increases but the elongation tends to decrease.

The weight-average molecular weight of the soluble component is from 10,000 to 600,000. The molecular weight is measured by gel permeation chromatography (GPC, model HPLC 802, supplied by Toyo Soda Mfg. Co., Ltd.). When the weight-average molecular weight is less than 10,000, the copolymer is an oily or pasty resin or a resin inferior in mechanical properties including strength and elongation and in practice cannot be used for moled articles. When the weight-average molecular weight exceeds 600,000, the melt fluidity lowers and interstices increase between expanded particles in the molded foam. The glass transition temperature of the soluble component is at least 80° C. When it is lower than 80° C., the copolymer composition is inferior in thermal-deformation resistance.

The proportions of units (a), (b), and (c) in the soluble component of the present inventive copolymer composition are in the following respective ranges:

(a) 30–70 mole %, (b) 1–10 mole %, (c) 25–70 mole %.

When the proportion of (a) is less than 30 mole %, the copolymer composition is unsatisfactory in flame resistance and gas impermeability, and the resulting molded foam is inferior in flame resistance and heat insulating efficiency. When the proportion of (a) exceeds 70 mole %, the thermal-deformation resistance decreases; the preferred range is from 35 to 60 mole %. When the proportion of (b) is less than 1 mole %, the glass transition temperature is undesirably low and the resulting molded foam is inferior in dimensional stability to heat. On other hand, it is difficult to produce a random vinylidene chloride copolymer in which the proportion of (b) exceeds 10 mole %, and if produced, the copolymer will be expensive; hence such a high proportion of (b) is uneconomical. When the proportion of (c) is less than 25 mole %, the thermal-deformation resistance is too low, and when this proportion exceeds 70 mole %, the copolymer composition and the molded foam have inferior properties; the preferred range is from 35 to 65 mole %.

The proportions of units (a), (b), (c), and (d) in the insoluble component are in the following respective ranges:

(a) 25–65 mole %, (b) 1–10 mole %, (c) 25–70 mole %, (d) 0.01–0.2 mole %.

When the proportion of (a) is less than 25 mole %, it becomes difficult to make the most of the advantages of flame resistance and gas impermeability, and when this proportion exceeds 65 mole %, the thermal-deformation resistance lowers; the preferred range is from 30 to 60 mole %. When the proportion of (b) is less than 1 mole %, the thermal-deformation resistance is too low, and when this proportion exceeds 10 mole %, properties inherent in the vinylidene chloride copolymer composition deteriorate; the preferred range of this proportion is from 1 to 8 mole %. When the proportion of (c) is less than 25 mole %, the thermal-deformation resistance is too low, and when this proportion exceeds 70 mole %, properties inherent in the vinylidene chloride copolymer composition deterioate. The proportion of (d) affects directly the proportion of the tetrahydrofuran-insoluble component. When the proportion exceeds 0.2 mole %, the melt fluidity at high temperature is markedly lower. The amount of a crosslinking agent used for introducing (d) should be chosen according to the intended applications of the product foam. Generally, the crosslinking agent is used in an amount of at least 0.01 mole % for achieving the effect of the insoluble component. The preferred range of this amount is from 0.01 to 0.1 mole %.

The copolymer composition of the present invention can be produced by the radical polymerization of; vinyldene chloride; at least one of the above cited N-substituted maleimides; at least one of the above cited ethylenic monomers and unsaturated carboxylic acids and their ester monomers; and at least one of the above cited divinyl monomers, diacrylate monomers, and dimethacrylate monomers.

For the polymerization, various known methods can be used including suspension polymerization, emulsion polymerization, solution polymerization, and bulk polymerization methods.

Any radical polymerization initiator may be used that, on heating, decomposes to produce free radicals. For example, it is generally known that diisopropyl peroxy dicarbonate is fitted for polymerizations at relatively low temperatures and lauroyl peroxide for polymerizations at relatively high temperatures.

The polymerization temperature and period can be properly chosen in consideration of the radical polymerization initiator used, removal of polymerization heat, yield, etc.

The copolymer composition of the present invention can be also produced by preparing components [A] and [B] separately according to the above-mentioned polymerization method and blending them. For separating and recovering the copolymer composition from the reaction product mixture, known operation methods are acceptable such as coagulation, evaporation, filtration, and drying.

Additives can be incorporated into the copolymer composition by known methods. Such additives include plasticizers, heat stabilizers, light stabilizers, antioxidants, colorants, etc.

The term "non-crystalline polymer" used in the present invention is a polymer which, on calorimetry by using a differential scanning calorimeter (DSC), gives no endothermic peak due to the fusion of crystalline region and moreover, on X-ray diffraction measurement, indicates no diffraction peak due to the presence of a crystalline region. In general, crystalline vinylidene chloride copolymers are constituted of more than 85 mole % of vinylidene chloride. These copolymers are eliminated from the scope of the present invention.

The blowing agent(s) used in the present invention is a volatile organic blowing agent having a lower boiling point than the glass transition temperature of the copolymer composition used. The blowing agent used is chosen in consideration of its solubility in the resin, vapor pressure at the foaming temperature, boiling point, etc. In particular, it is preferable to use a blowing agent having a mole-average solubility parameter (SP value) of 5.7 to 9.7. Such blowing agents include; aliphatic hydrocarbons, e.g. propane (SP 6.4), butane (6.8), isobutane (6.8), pentane (7.0), isopentane (6.7), and neopentane (6.3); chlorinated hydrocarbons, e.g. methyl chloride (9.7) and ethyl chloride (9.2) and methyl chloride (9.7); fluorinated hydrocarbons, e.g. trichloromonofluoromethane (7.6), dichlorodifluoromethane (5.5), dichloromonofluoromethane (8.3), monochlorodifluoromethane (6.5), trichlorotrifluoroethane (7.3), dichlorotetrafluoroethane (6.2), 1-chloro-1,1-difluoroethane (6.8), and difluoroethane (7.0) 1,1-dichloro-2,2,2-trifluoroethane (7.3), 1,1,1,2-tetrafluoroethane (6.6); and ethers, e.g. dimethyl ether (7.6). When good foaming conditions are not achieved with one blowing agent, it is desirable that two or more blowing agents can be mixed together to prepare a more suitable blowing agent composition.

Solubility parameter values in the above parentheses are just the same as shown in Polymer Hand Book Second Edition, written by J. BRANDRUP and E. H. IMMERGUT, issued 1974. As to SP values not given in this book, there have been shown values searched from other literature or values (at 25° C.) calculated from the following formula:

$$(SP\ value)\ 2 = d/M\ (\Delta H - RT)$$

wherein,
d: density (g/cc)
M: molecular weight (g/mole)
$\Delta H$: latent heat of evaporation (cal/mole)
R: gas constant (cal/mole.°K.)
T: absolute temperature (°K.)

In the case of mixed blowing agents, the mole-average solubility parameter used is the total product of the respective SP values of the component blowing agents and this respective mole fractions.

Of the above listed blowing agents, fluorinated hydrocarbons are preferable for the purpose of permitting the product foam to retain the low thermal conductivity over a long term, this being one of the objects of the present invention. With a mixture of fluorinated hydrocarbon blowing agents, the excellent function thereof in cooperation with the gas impermeability of the resin enables the expandable resin particles to retain their expandability for a prolonged time and provides superior heat insulating properties to the resulting molded foam, which retains these properties over a long period of time.

Impregnation of the resin with a blowing agent can be accomplished by the vapor-phase or liquid-phase method of impregnating resin particles with a blowing agent in vapor or liquid form, for instance, in an autoclave while applying, if necessary, heat and pressure, or the aqueous suspension method of impregnating resin particle suspended in water with a blowing agent. It is also possible to produce expandable polymer particles directly by carrying out the polymerization in the presence of a blowing agent.

In the present invention, the above listed cited blowing agents can be used generally in amounts of 1 to 40 parts by weight for 100 parts by weight of resin particles. The amount used is controlled depending upon the intended foam density. Preferably, 5 to 30 parts by weight of the blowing agent is used.

Expansion for producing the multicellular pre-expanded particles of the present invention can be carried out by known methods, for example, the method of expanding resin particles impregnated with a blowing agent as stated above, by heating the particles in a heating medium such as steam, hot water or hot air. Accordingly, the viscoelastic behavior of the blowing agent-resin mixture in a hot fluid state has great influence on the closed cell proportion in the resulting multicellular pre-expanded particles. When the elastic modulus of the mixture is too high, it is difficult to produce foams having a high expansion ratio or having fine uniform cells. When viscous fluid character is dominant, closed-cell foams are hard to obtain. For producing foams of high expansion ratios having closed-cell proportions of at least 60%, it is desirable to select, from base resins of the present inventive type, a resin having an elongation exceeding 200% at least in the temperature range of from the glass transition temperaure (Tg) of the resin to (Tg+50)° C. The term "closed-cell proportion" used herein means the volume ratio (%) of the closed cells to all the cells in the foam. This porportion is measured with an air-comparison type of hydrometer.

As to the heating conditions for producing the multicellular pre-expanded particles, a proper temperature of heating for a prescribed heating period is selected from temperatures above the glass transition temperature (Tg) of the base resin. Generally, suitable conditions are a temperature of 100° to 130° C. and a time of 5 to 180 seconds.

The molded foam of the present invention can be produced from multicellular pre-expanded particles prepared as stated above by known methods of shaping in molds. That is, these multicellular pre-expanded particles are placed in a mold having number of small holes which can be closed but cannot be sealed hermetically, the particles are heated by introducing a heating fluid such as steam through the small holes, to foam, expand, fill the interstices between the particles, and fuse the particles together. The fused mass is quenched, thus forming a molded foam. In this way, a molded foam is produced which has a single body structure formed of numerous multicellular expanded particles which are fused together with their neighboring particles, being in intimate contact one with another. In this method, nearly the same heating conditions can be applied as in the well-known method for molding expanded polystyrene particles and appropriate conditions are chosen depending upon the shape and thickness of the intended product foam. Such a single-body, molded foam as stated above can be obtained generally by mold-heating (steam of 0 kg/cm$^2$-G), one-side heating (steam of 0.1–0.5 kg/cm$^2$-G), or both-side heating (steam of 0.7–2.0 kg/cm$^2$-G), followed by cooling the mold with water. Since mechanical strength required for the molded foam depends on its intended use, the density of the foam may be varied as required. In the present invention, the expansion ratio can be controlled by the amount of impregnating blowing agent, the heating temperature and the time period when preparing the multicellular preexpanded particles. Molded foams of 15–300 kg/m$^3$ in density can be produced as required.

For the purpose of producing molded foams which will exhibit excellent heat insulating efficiency, it is desirable to inhibit as far as possible the gaseous blowing agent enclosed in the cells from permeating and diffusing into the atmosphere. That is, it is desirable to shorten the ageing time between the completion of preparaing multicellular pre-expanded particles by heating expandable resin particles and the start of mlding the product foam. This ageing time is generally up to 24 hours, preferably up to 1 hour, at room temperature. When product foams are for purposes other than heat insulators, this reduction of the ageing time is not necessarily required, of course, and ageing conditions similar to those for pre-expanded polystyrene beads are possible, for example, an ageing time of about one week is allowable.

The vinylidene chloride-based resin composition of the present invention, in spite of the non-crystalline nature thereof, has characteristics similar to those of conventional crystalline vinylidene chloride-based resins, that is, flame resistance, chemical resistance, and high gas impermeability, and additionally has improved resistance to thermal deformation that conventional non-crystalline vinylidene chloride-based resins could not have.

The molded non-crystalline vinylidene chloride-based resin foam of the present invention retaining the gas impermeability, flame resistance, oil and chemical resistance, and mechanical strength which are superior characteristics of the base resin composition. The foam of the present invention is provided with additional unprecedentedly superior functions by making the most of the high glass transition temperature (Tg) of the base resin. That is, the invention provides novel molded resin foams which are self-extinguishing in particular, which can retain low thermal conductivity over a long term, and which are superior in dimensional stability at high temperatures and at low temperatures and, therefore which can be used for a variety of industrial applications. Thus, the present invention is extremely beneficial from the industrial point of view.

The following examples illustrate the present invention in more detail.

Evaluation methods used in the invention are as follows:

Density of foam: In accordance with JIS K6767.

Expansion ratio: Density of base resin over density of foam.

Proportion of closed cells: In accordance with ASTM D-2856.

Thermal conductivity: In accordance with ASTM C-518.

Average cell diameter: Arithmetic mean of diameters of 5–10 cells measured at an optionally taken cross section of foam.

5% compression strength: Measured at 5% compression strain in accordance with ASTM D-1621.

Limiting oxygen index: In accordance with JIS K-7201.

Glass transition temperature (Tg): Determined in accordance with ASTM-D-3418-75 by using a differential scanning calorimeter (DSC).

Elongation: Vinylidene chloride-based resin sheets (0.2–0.4 mm thick×5 mm width) are subjected to a tensile test (distance between chucks: 50 mm, draw rate 200 mm/min) at different temperatures to determine the elongation at break point.

Method for measuring content of insoluble component: A predetermined amount (Wo g) of polymer sample is weighed out and immersed in excess tetrahydrofuran heated at 40° C. to dissolve the soluble component. Then, the insoluble matter is filtered on a 200-mesh filter, and weighed (W g). The content is determined from the formula $$\text{content of insoluble component (\%)} = (W/Wo) \times 100.$$

Method for measuring molecular weight: Using monodisperse polystyrene standard samples, a working curve for GPC is prepared in advance. Based on this curve, the molecular weight is determined.

Standard samples: Molecular weight
 $77.5 \times 10^4$
 $10.7 \times 10^4$
 $1.67 \times 10^4$
 $0.28 \times 10^4$ Solvent: Tetrahydrofuran Column: Polystyrene gel (GMH 6, Toyo Soda, Mfg. Co., Ltd.)

EXAMPLE 1

150 Parts (by weight, the same applies hereinafter) of pure water and 0.2 part of hydroxypropylmethyl cellulose as a suspending agent are charged in a reaction vessel. Thereto is added a monomer mixture prepared by dissolving 5 parts (2.4 mole %) of N-phenylmaleimide in a mixture of 30 parts (45.1 mole %) of acrylonitrile, 15 parts (11.4 mole %) of styrene, and 0.04 part (0.025 mole %) of divinylbenzene and then dissolving 50 parts (41.1 mole %) of vinylidene chloride, and further added 0.6 part of lauroyl peroxide as a radical polymerization initiator. After replacement of the air with nitrogen, stirring of this reaction mixture is started and the polymerization is conducted at 60° C. for 24 hours. Thereafter, the formed polymer is separated by filtration and dried. The amount of monomers remaining in the polymer was not more than 0.2%. Results of the polymerization were as follows:

Polymerization yield 98%, Glass transition temperature (Tg) 96° C., Limiting oxygen index 32, Content of tetrahydrofuran-soluble component 41 wt %, Content of insoluble component 59 wt %, Tg of soluble component 83° C., Weight-average molecular weight of soluble component $27 \times 10^4$, Elongation at 120° C., 330%.

The qualitative or quantitative analysis of the obtained copolymer composition, soluble component, and insoluble component was conducted in the following way:

The constitutional unit (a) derived from vinylidene chloride was analyzed qualitatively by pyrolytic gas chromatography [PGC, pyrolysis oven (model JHP-2, supplied by Nihon Bunko Kogyo Co., Ltd.)], gas chromatograph (model GC-4BM, supplied by Shimazu Co., Ltd.) and quantitatively by chlorine analysis (oxygen flask combustion method).

The constitutional unit (b) derived from N-phenylmaleimide was analyzed qualitatively and quantitatively by Fourier-transform infrared absorption spectroscopy (FT-IR). An absorption band due to the stretching vibration of C—N was observed at 1388 cm$^{-1}$ and an absorption band due to the stretching vibration of C=O at 1712 cm$^{-1}$. This unit (b) was determined from the ratio of the absorption peak due to C=O to the absorption peak at 1064 cm$^{-1}$ due to the stretching vibration of C—Cl of the constitutional unit (a) derived from vinylidene chloride.

The constitutional unit from acrylonitrile was analyzed qualitatively by PGC and quantitatively by FT-IR spectroscopy. This unit was determined from an absorption peak at 2225 cm$^{-1}$ due to the stretching vibration of C≡N and the above-said absorption peak at 1064 cm$^{-1}$.

The constitutional unit from styrene was analyzed qualitatively and quantitatively by PGC, wherein this unit was determined from the height of the characteristic peak due to the styrene monomer resulting from the pyrolysis.

The constitutional unit (d) from divinylbenzene was analyzed qualitatively and quantitatively from the degree of swelling of the polymer sample in tetrahydrofuran. This unit content can be determined from the found degree of swelling and a working curve prepared previously which shows the relation between the content and the degree of swelling.

Figure 1:
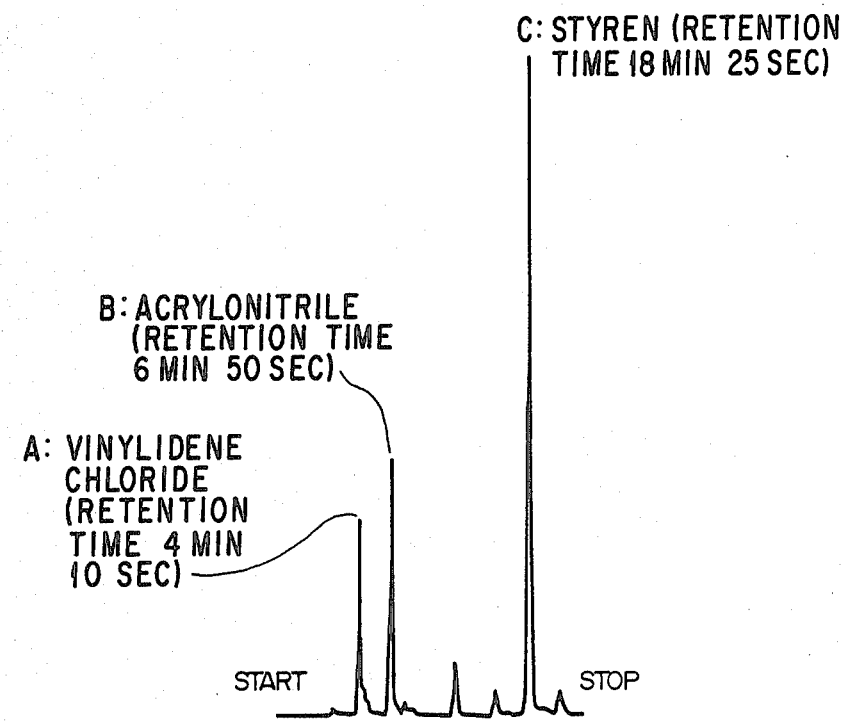
FIG. 1 is a PGC chart for a copolymer composition of the present invention.
Figure 2:
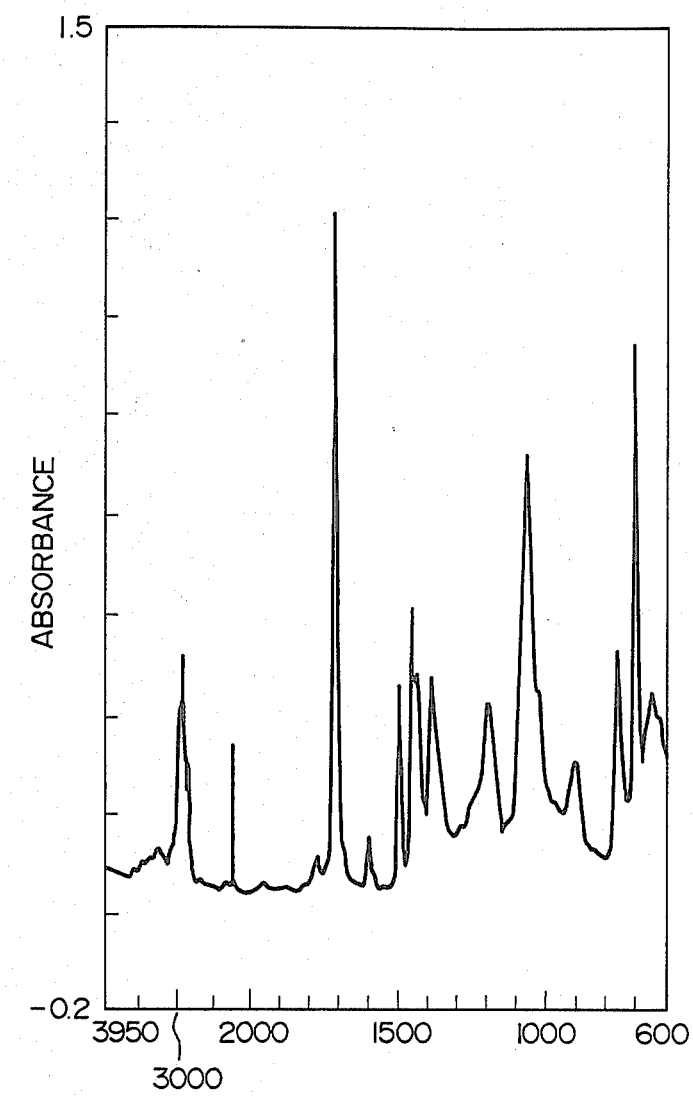
FIG. 2 is an FT-IR chart for a copolymer composition of the present invention.

FIGS. 1 and 2 show the PGC chart and FT-IR chart, respectively, of the copolymer composition.

The thus determined proportions of the constitutional units in the soluble component [A] and in the insoluble component [B] of the obtained copolymer composition were as follows:

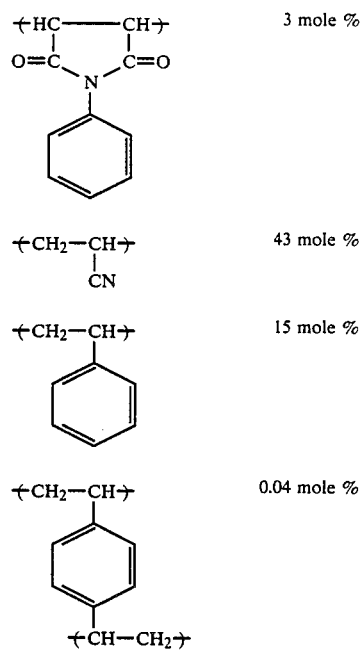

100 Parts of particles having an average particle diameter of 0.4 mm, of the vinylidene chloride copolymer composition prepared by the above polymerization process are placed in an autoclave, which is then closed tightly and evacuated. Then, 300 parts of a liquid blowing agent mixture of Freon 11 and Freon 22 in a weight ratio of 90:10 is forced into the autoclave. Then the contents are stirred at 100° C. for about 70 hours and then cooled. After the pressure has been returned to normal, the particles are taken out. These particles were found to contain about 19 parts of the blowing agent. Thereafter, these expandable resin particles were allowed to stand open in a room for 2 weeks, and then expanded by heating with steam of 0.5 kg/cm$^2$-G for 20 seconds, giving pre-expanded particles of 24 expansion ratio. These particles were found to have an average particle diameter of about 1.2 mm, an average cell diameter of 0.1 mm, and a closed cell proportion of 95%.

In 30 minutes after completion of the preexpansion, these pre-expanded particles were molded by heating with steam of about 1.1 kg/cm$^2$-G by using an expandable polystyrene steam molding machine, yielding a molded foam in flat plate form (25 mm thick×300 mm square, 40 kg/m$^3$ density).

Plates (100 W×100 L×25 T mm) were cut off from the obtained foam, and heated separtely at predetermined different temperatures for 24 hours. Dimensional changes of the heat treated plates were read out to determine their percentages of volume change. Results of this evaluation are shown by curve I of FIG. 3. The 5% compression strength of this foam was 2.0 kg/cm$^2$.

Figure 4:
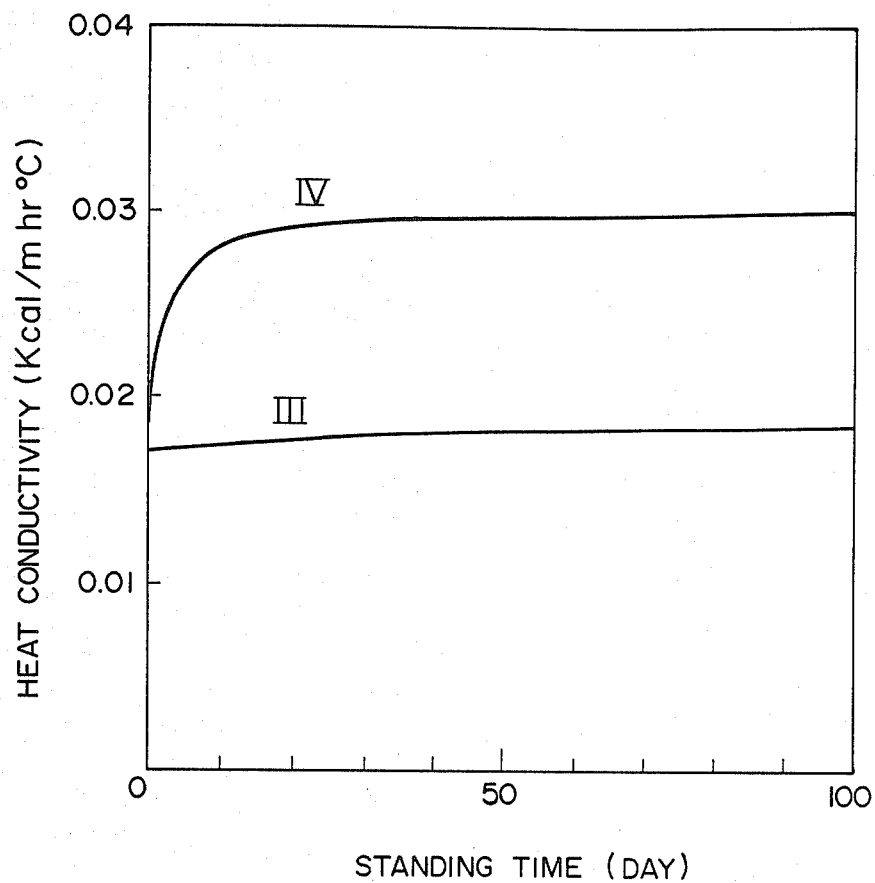
FIG. 4 is a graph showing the relationship between thermal conductivity and time in days after molding for a molded foam according to the invention (curve III) and for an extrusion-formed, commercial polystyrene foam (curve IV).

FIG. 4 shows results of following the change of the thermal conductivity of this plate (curve III) of 40 kg/cm$^3$ in density with time, and for comparison, results of a similar test on extruded plates of a polystyrene foam (curve IV), which is regarded as excellent in heat insulation properties.

COMPARATIVE EXAMPLE 1

According to Example 5 of U.S. Pat. No. 4,613,626, a molded foam was prepared from a 50/50 vinylidene chloride-methyl methacrylate copolymer. Tg of the base resin is 71° C. Plates (100 W×100 L×25 T mm) were cut off from the obtained foam and their percentages of volume change on heating were measured. Results of the measurement are shown by curve II of FIG. 3.

As is evident from FIG. 3, the dimensional stability to heat of the conventional vinylidene chloride-based resin foam is improved largely by using the base resin of the present invention.

EXAMPLE 2

Polymerization and treatment were conducted according to the procedure of Example 1 except that the proportions of monomers in the reaction mixtures prepared were as shown in Table 1.

TABLE 1

| No. | Vinylidene chloride (mole %) | N—Substituted maleimide (mole %) | Ethylenic monomer (mole %) | | Divinylbenzene (mole %) |
|---|---|---|---|---|---|
| 1 | 41.1(50) | N—PMI 2.4(5) | AN 45.1(30) | St 11.4(15) | 0.013 (0.02) |
| 2 | 41.1(50) | N—2-MPMI 2.2(5) | AN 45.2(30) | St 11.5(15) | 0.013 (0.02) |
| 3 | 41.7(50) | N—PMI 4.7(10) | AN 45.8(30) | St 7.8(10) | 0.025 (0.04) |
| 4 | 52.9(50) | N—PMI 6.0(10) | MMA 41.1(40) | | 0.038 (0.05) |
| 5 | 41.2(50) | N—2-Cl—PMI 2.0(5) | AN 45.2(30) | St 11.5(15) | 0.025 (0.04) |
| 6 | 41.1(50) | N—2-CH—PMI 2.2(5) | AN 45.2(30) | St 11.5(15) | 0.025 (0.04) |
| 7 | 40.5(50) | N—M—MI 3.6(5) | AN 44.6(30) | St 11.3(15) | 0.025 (0.04) |
| 8 | 44.6(50) | N—PMI 3.5(7) | AN 32.7(20) | St 19.2(23) | 0.020 (0.03) |
| 9 | 46.7(50) | N—PMI 4.2(8) | AN 25.6(15) | St 23.5(27) | 0.027 (0.04) |
| 10 | 30.8(40) | N—PMI 2.6(6) | AN 56.5(40) | St 10.1(14) | 0.023 (0.04) |
| 11 | 40.8(50) | N—PMI 1.4(3) | AN 44.8(30) | St 13.0(17) | 0.013 (0.02) |
| 12 | 59.4(55) | N—PMI 9.1(15) | MMA 31.5(30) | | 0.040 (0.05) |
| 13 | 41.1(50) | N—PMI 2.4(5) | AN 45.1(30) | St 11.4(15) | — |
| 14 | 41.1(50) | N—2-M—PMI 2.2(5) | AN 45.2(30) | St 11.5(15) | — |

Abbreviations in the above and other tables mean as follows:

AN: Acrylonitrile
St: Styrene
MMA: Methyl methacrylate
N-PMI: N-Phenylmaleimide
N-M-MI: N-Methylmaleimide
N-2-M-PMI: N-2-Methylphenylmaleimide
N-2-Cl-PMI: N-2-Chlorophenylmaleimide
N-2-CH-PMI: N-2-Cyclohexylphenylmaleimide Figures in parentheses in the tables represent parts by weight.

In run Nos. 8 and 9, 0.8 part of lauroyl peroxide (polymerization initiator) was used and the polymerization period was 30 hours and 48 hours, respectively.

Table 2 shows results of evaluation or analysis, for each run, of the polymerization yield under the above conditions of polymerization; the glass transition temperature, limiting oxygen index (LOI), elongation at 120° C., and content of tetrahydrofuran-soluble component of the resin composition obtained; the glass transition temperature, weight-average molecular weight, and constitutional unit contents of the soluble component; and the content of tetrahydrofuran-insoluble component and constitutional unit contents of the insoluble component.

COMPARATIVE EXAMPLE 2

Polymerization and treatment were conducted according to the procedure of Example 1 but the proportions of vinylidene chloride and ethylenic monomers in the reaction mixtures prepared were as shown in Table 3. Table 3 also shows the polymerization yield and the glass transition temperature, weight-average mlecular weight, limiting oxygen index, and elongation at 120° C. of each resin composition obtained.

EXAMPLE 3

300 Parts of n-hexane is charged in a reaction vessel. Thereto are added 50 parts (41.1 mole %) of vinylidene chloride, 5 parts (2.4 mole %) of N-phenylmaleimide, 30 parts (45.1 mole %), and 15 parts (11.4 mole %) of styrene, as monomers, and 0.2 part of diisopropyl peroxy dicarbonate as a polymerization initiator. After replacement of the air with nitrogen, the polymerization is conducted with stirring at 40° C. for 48 hours. Results of the polymerization were as follows:

Polymerization yield: 97%
Resin composition obtained: Glass transition temperature 96° C., Limiting oxygen index 32%, Elongation at 120° C. 400%, Weight-average molecular weight $22.5 \times 10^4$, Proportions of constitutional units: vinylidene chloride 41 mole %, N-phenylmaleimide 3 mole %, acrylonitrile 44 mole %, styrene 12 mole %.

TABLE 2

| Run No. | Polymerization yield (%) | Tg (°C.) | LOI (%) | Elongation at 120° C. (%) | Content of THF-insoluble component (%) | Weight average M. W. of soluble component ($\times 10^4$) | Tg of soluble component (°C.) |
|---|---|---|---|---|---|---|---|
| 1 | 98 | 96 | 32 | 380 | 34 | 39.0 | 89 |
| 2 | 98 | 98 | 32 | 250 | 35 | 37.6 | 91 |
| 3 | 96 | 102 | 32 | 280 | 58 | 22.2 | 88 |
| 4 | 98 | 85 | 24 | 450 | 65 | 18.0 | 81 |
| 5 | 97 | 101 | 32 | 270 | 60 | 24.2 | 87 |
| 6 | 97 | 94 | 32 | 260 | 58 | 24.0 | 82 |
| 7 | 97 | 98 | 32 | 290 | 58 | 22.4 | 90 |
| 8 | 99 | 97 | 28 | 380 | 44 | 24.5 | 92 |
| 9 | 98 | 97 | 26 | 390 | 62 | 21.2 | 90 |
| 10 | 98 | 107 | 27 | — | 64 | 28.3 | 97 |
| 11 | 98 | 85 | 32 | 310 | 32 | 33.5 | 83 |
| 12 | 98 | 85 | 25 | — | 69 | 19.7 | 85 |
| 13 | 98 | 96 | 32 | 380 | — | 29.9 | — |

TABLE 2-continued

| | | | | | | | |
|---|---|---|---|---|---|---|---|
| 14 | 98 | 98 | 32 | 270 | — | 28.6 | — |

| | Composition of resin (analysis value) (mole %) | | | | | | |
|---|---|---|---|---|---|---|---|
| | THF soluble component | | | THF insoluble component | | | |
| VDC | N—Substituted maleimide | Ethylenic monomer | | VDC | N—Substituted maleimide | Ethylenic monomer | DVB |
| 43 | N—PMI 2 | AN 47 | St 8 | 36 | N—PMI 4 | AN 38 | St 22 | 0.04 |
| 43 | N—2-M—PMI 2 | AN 46 | St 9 | 36 | N—2-M—PMI 3 | AN 39 | St 22 | 0.04 |
| 45 | N—PMI 4 | AN 45 | St 6 | 38 | N—PMI 6 | AN 44 | St 12 | 0.04 |
| 55 | N—PMI 6 | MMA 39 | | 52 | N—PMI 6 | MMA 42 | | 0.05 |
| 44 | N—2-Cl—PMI 2 | AN 45 | St 8 | 39 | N—2-Cl—PMI 3 | AN 44 | St 14 | 0.04 |
| 46 | N—2-CH—PMI 1 | AN 46 | St 8 | 38 | N—2-CH—PMI 3 | AN 43 | St 16 | 0.04 |
| 45 | N—M—MI 3 | AN 44 | St 8 | 40 | N—M—MI 4 | AN 40 | St 16 | 0.04 |
| 46 | N—PMI 3 | AN 32 | St 19 | 43 | N—PMI 4 | AN 34 | St 19 | 0.04 |
| 47 | N—PMI 3 | AN 25 | St 25 | 46 | N—PMI 5 | AN 25 | St 24 | 0.04 |
| 35 | N—PMI 2 | AN 55 | St 8 | 29 | N—PMI 3 | AN 57 | St 11 | 0.03 |
| 42 | N—PMI 1 | AN 47 | St 10 | 39 | N—PMI 2 | AN 40 | St 19 | 0.04 |
| 60 | N—PMI 9 | MMA 31 | | 59 | N—PMI 9 | MMA 32 | | 0.06 |
| 41 | N—PMI 3 | AN 45 | St 11 | — | — | — | — | — |
| 41 | N—2-M—PMI 3 | AN 45 | St 11 | — | — | — | — | — |

TABLE 3

| Run No. | VDC (mole %) | Ethylenic monomer (mole %) | Polymerization yield (%) | Tg (°C.) | LOI (%) | Weight average M. W. × 10⁴ | Elongation at 120° C. (%) |
|---|---|---|---|---|---|---|---|
| 1 | 50.7 (50) | MMA 49.3 (50) | 99 | 71 | 23 | 20.0 | 820 |
| 2 | 40.4 (50) | AN 44.5 (30) St 15.1 (20) | 97 | 74 | 31 | 22.4 | 620 |
| 3 | 35.3 (50) | AN 64.7 (50) | 95 | 82 | 35 | 28.0 | 102 |

COMPARATIVE EXAMPLE 3

50 Parts (55.3 mole %) of vinylidene chloride, 20 parts (12.5 mole %) of N-phenylmaleimide, and 30 parts (32.2 mole %) of methyl methacrylate were polymerized and treated according to the procedure of Example 1.

Unreacted N-phenylmaleimide was found remaining in the product polymer obtained through filtration and drying, and the polymerization yield was 87%. Properties of the obtained resin composition were as follows: Glass transition temperature 78° C., Limiting oxygen index 34%, Weight-average molecular weight 24.4×10⁴, Elongation at 120° C. 580%.

EXAMPLE 4

Copolymer particles were prepared according to the procedure of Example 1 except that the amount of divinylbenzene, a crosslinking agent, was varied as 0, 0.01, 0.03, 0.05, and 0.07 mole %.

Resin particles having an average particle diameter of 0.4 mm were selected from the obtained particles, and impregnated with a blowing agent in the same manner as in Example 1, giving expandable resin particles, which were then allowed to stand in a room for 2 weeks. Then, these particles were expanded by heating with steam of 1.0 kg/cm² for 30 seconds. Table 4 shows the expansion ratio, closed cell proportion, and average cell diameter of the obtained porous pre-expanded particles of each experiment.

In 24 hours after completion of the pre-expansion, these multicellular pre-expanded particles were molded in the same manner as in Example 1, yielding molded foams. Table 4 also shows results of measuring the 5% compression strengths, percentages of volume change on heating at 70° C., and thermal conductivities of the obtained foams.

It is evident from Table 4 that, when the content of insoluble component in the base resin is less than 10%, the closed cell proportions in the multicellular pre-expanded particles does not reach 80% and the resulting molded foam exhibits a somewhat high thermal conductivity and when the content of insoluble component exceeds 80%, the expansion ratio is low and the fusion of multicellular particles in the molded foam is insufficient and the compression strength of the foam is somewhat low for the density thereof.

That is, it proves that the content of insoluble component in the base resin is desired to lie in the range of 10 to 80% for the purpose of providing molded foams abundant in closed cell, low thermal conductive, and superior in compression strength.

EXAMPLE 5

Resin particles impregnated with a blowing agent were prepared according to the procedure of Example 1 except that the particle diameter of the base resin was varied as 0.08, 0.1, 0.4, 0.6, 0.8, 1.0, and 1.2 mm. The amount of blowing agent contained in the expandable resin particles thus obtained was measured immediately after completion of the impregnation and after 8 days' standing open under atmospheric pressure at 32° C. Results of the measurement are shown in FIG. 5, wherein curve V is of the former case and curve VI is of the latter case.

As is clear from FIG. 5, base resin particles having larger particle diameters than 1 mm exhibit markedly low tendencies to be impregnated with the blowing agent while base resin particles having smaller particle diameters than 0.1 mm lose quickly the blowing agent contained therein.

using an expandable polystyrene molding machine, yielding foams 25 mm thick and 300 mm square. Table 5 summarizes the steam pressures necessary in these molding operations to fuse the pre-expanded particles so that they may be in intimate contact one with another and none of interstices may remain between them, and the densities and 5% compression strengths of the obtained foams.

As is evident from Table 5, a temperature condition as high as 130° C. is undesirable for the impregnation of base resin particles with the blowing agent since the production of molded foams will require a high steam

TABLE 4

| | | Amount of divinyl-benzene used (mole %) | Expandable resin particles | | Multicellular pre-expanded particles | | | Molded foam | | | |
|---|---|---|---|---|---|---|---|---|---|---|---|
| | Run No. | | Content of in-soluble component (%) | Content of blow-ing agent (phr) | Closed cell propor-tion (%) | Expan-sion ratio | Average cell diameter (mm) | Density (kg/m$^3$) | 5% Compres-sion strength (kg/cm$^2$) | Volume change (%) | Thermal conductivity (Kcal/m · hr. °C.) |
| Example 4 | 1 | 0.01 | 12 | 19 | 82 | 29 | 0.15 | 35 | 1.6 | 0.9 | 0.017 |
| | 2 | 0.03 | 55 | 19 | 95 | 44 | 0.10 | 24 | 0.68 | 1.8 | 0.018 |
| | 3 | 0.05 | 70 | 19 | 98 | 30 | 0.09 | 33 | 1.4 | 1.3 | 0.016 |
| | 4 | 0.07 | 83 | 19 | 98 | 21 | 0.02 | 59 | 2.3 | 0.5 | 0.021 |
| | 5 | 0 | 0 | 19 | 60 | 28 | 0.18 | 42 | 1.8 | 3.5 | 0.023 |

EXAMPLE 6 AND COMPARATIVE EXAMPLE 4

Five groups of expandable resin particles were prepared from the same base resin particles and blowing agent as used in Example 1 but the impregnation temperature and period were varied from group to group as shown in Table 5. The amount of blowing agent contained in each group of particles is shown also in Table 5.

These groups of expandable resin particles were allowed to stand in an open state for 2 weeks at room temperature, and then were expanded by heating with steam of 1.0 kg/cm$^2$-G for 30 seconds, giving different groups of pre-expanded particles. Table 5 also shows the cell diameter, closed cell proportion, and expansion ratio of each group of pre-expanded particles obtained. The dependence of the expansion ratio on the impregnation temperature is shown in FIG. 6. As is apparent from FIG. 6, expandable resin particles prepared at an impregantion temperature of 130° C. have remarkably-low expandability. This is because the base resin under such a high temperature condition as 130° C. undergoes thermal decomposition and hence properties of the resin in itself are altered. Accordingly, it is necessary to carry out the impregnation at a temperature not exceeding 115° C., in other words, at a temperature of up to [Tg (96° C.) of the base resin +20]° C.

Then, the above groups of pre-expanded particles were aged for 24 hours in a room, and then molded by pressure exceeding the installation pressure (ca. 1.5 kg/cm$^2$) of expandable polystyrene molding machines.

On the other hand, a too low temperature of the impregnation is also undesirable since a very long time is necessary to impregnate base resin particles with the prescribed amount of blowing agent.

TABLE 5

| | Run No. | Expandable resin particles | | | Pre-expanded particles | | | Molded foam | | |
|---|---|---|---|---|---|---|---|---|---|---|
| | | Impreg-nation tempera-ture (°C.) | Impreg-nation period (hrs) | Amount of Blowing agent contained (Part) | Expan-sion ratio | Cell di-ameter (mm) | Closed cell pro-portion (%) | Steam pressure for molding (kg/cm$^2$) | Density (kg/m$^3$) | 5% Com-pression strength (kg/cm$^2$) |
| Example 6 | 1 | 70 | 200 | 7.3 | 4 | 0.09 | 98 | 1.3 | 250 | — |
| | 2 | 85 | 200 | 18.5 | 48 | 0.11 | 92 | 1.1 | 21 | 0.63 |
| | 3 | 100 | 70 | 19.0 | 55 | 0.08 | 95 | 1.1 | 18 | 0.53 |
| | 4 | 115 | 24 | 19.2 | 53 | 0.10 | 93 | 1.2 | 19 | 0.56 |
| Comparative Example 4 | | 130 | 8.5 | 18.5 | 30 | 0.09 | 85 | 1.5 | No foam could be molded | |

EXAMPLE 7 AND COMPARATIVE EXAMPLE 5

Four groups of expandable resin particles were prepared by impregnating particles (particle diameter ca. 0.5 mm) of base resins different in monomer composition [molar ratio of vinylidene chloride (VDC), N-phenylmaleimide (N-PMI), acrylonitrile (AN), and styrene (St)], amount of divinylbenzene (DVB) used as a crosslnking agent (including the case where no DVB was used), and properties, as shown in Table 6, with a blowing agent mixture of Freon 11 and ethylene chloride in 90:10 weight ratio, in the same manner as in Example 1. The amount of blowing agent contained was controlled by varying the impregnation period as shown in Table 6.

These groups of expandable resin particles were allowed to stand for 2 weeks in a room, and then expanded by heating with steam of 0.5 kg/cm$^2$-G for 30 seconds, giving different groups of pre-expanded particles. Table 6 shows the expansion ratio, closed cell proportion, particle diameter, and cell diameter of each group of pre-expanded particles obtained. Then, these groups of pre-expanded particles were aged for 24 hours in a room, and molded to yield foams. Table 6 shows the densities and percentages of volume change on heating at 70° C. for 24 hours of these molded foams.

For comparison, two groups of expandable resin particle were prepared by following the procedure of Example 7 above but using base resins containing no constitutional unit derived from a N-substituted maleimide (the compositions and properties of these base resins are as shown in Table 6). Similarly, pre-expanded particles and molded foams were prepared from these expandable resin particles and evaluated. Results of the evaluation are shown in Table 6.

As can be seen from Table 6, the base resin of Run No. 5 (comparative Example 5) exhibited a very low elongation of 50% on heating, hence providing pre-expanded particles having a clossed cell proportion as low as 35%. On the other hand, base resins of Run Nos. 4 and 6 exhibited elongations of 380% and 680%, respectively, when heated, and provided pre-expanded particles having closed cell proportions of 60% and 72%, respectively. Resins exhibiting the higher elongations at elevated temperature tend to provide the higher proportions of closed cells to multicellular pre-expanded particles. But, the base resin of Run No. 6, though the cause is not clear, was found to have a drawback in that pre-expanded particles from this base resin have large cell diameters for particle diameters.

Base resins of Comparative Example 5, having no crosslinked structure, tend to provide lower proportions of closed cells to multicellular pre-expanded particles than do the base resins of Example 7 which have crosslinked structures.

What is claimed is:

1. Expandable vinylidene chloride-based resin particles comprising 100 parts by weight of a non-crystalline vinylidene chloride-based resin composition and 1 to 40 parts by weight of a volatile organic blowing agent or a volatile organic blowing composition, said resin composition consisting of a tetrahydrofuran-soluble component [A] which is a random copolymer having a weight-average molecular weight of 10,000 to 600,000 constituted of different unit represented severally by the following general formulae

  (a)

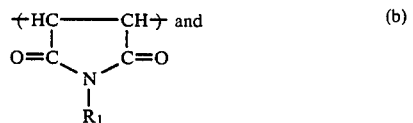 and  (b)

  (c)

wherein; $R_1$ denotes alkyl of 1 to 4 carbon atoms, cyclohexyl, phenyl, or

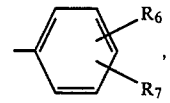, each of $R_6$ and $R_7$ being —$CH_3$, —$C_2H_5$, —Cl,

TABLE 6

| | Run No. | Base resin particles (particle diameter ca. 0.5 mm) | | | | | LOI (%) | Tg (°C.) | High-temperature elongation (%) (°C.) | Impregnation with blowing agent | |
|---|---|---|---|---|---|---|---|---|---|---|---|
| | | Monomer composition mole % (Part by wt) | | | | | | | | Period (hrs) | Amount of blowing agent contained (part by wt.) |
| Example 7 | 1 | VDC 30.8 (40) | N—PMI 2.6 (6) | AN 56.5 (40) | St 10.1 (14) | DVB 0.023 (0.04) | 27 | 107 | — | 20 | 18 |
| | 2 | 41.1 (50) | 2.4 (5) | 45.1 (30) | 11.4 (15) | 0.013 (0.02) | 32 | 96 | — | 18 | 17 |
| | 3 | " | " | " | " | 0 | " | " (120° C.) | 380 | 0.5 | 8 |
| | 4 | " | " | " | " | 0 | " | " | " | 18 | 17 |
| Comparative Example 5 | 5 | VDC 35.3 (50) | | AN 64.7 (50) | — | | 35 | 82 | 50 (105° C.) | 40 | 22 |
| | 6 | VDC 38 | AN 41 | MAN 21 | — | | | 90 | 680 (115° C.) | 80 | 24 |

| | Run No. | Multicellular pre-expanded particle | | | | Molded foam | |
|---|---|---|---|---|---|---|---|
| | | Particle diameter (mm) | Closed cell proportion (%) | Cell diameter (mm) | Expansion ratio | Density (kg/m³) | Volume change (%) |
| Example 7 | 1 | 1.4 | 92 | 0.10 | 24 | 40 | 0.7 |
| | 2 | 1.3 | 95 | 0.08 | 16 | 62 | 1.3 |
| | 3 | 1.0 | 65 | 0.12 | 11 | 91 | 3.2 |
| | 4 | 1.6 | 60 | 0.18 | 33 | 49 Slight sinks developed | — |
| Comparative Example 5 | 5 | 1.5 | 35 | 0.2 | 28 | Molding was infeasible | |
| | 6 | 1.4 | 72 | 1.1 | 23 | 43 | 5.3 |

—Br, —$OCH_3$, or —H; each of $R_2$ and $R_4$ denotes —H or —$CH_3$; $R_3$ denotes halogen, —CN,

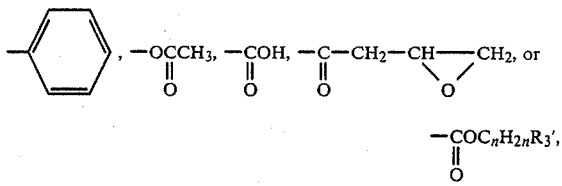

n being an integer 1 to 8 and $R_3'$ being —H or —OH;

a tetrahydrofuran-insoluble component [B] which is a random copolymer constituted of different units represented severally by the general formulae (a), (b), and (c) and the following general formula (d),

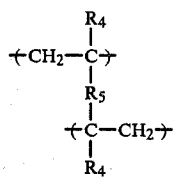

wherein; (a), (b), (c), $R_1$, $R_2$, $R_3$, $R_4$, $R_6$ and $R_7$ are defined as above
and $R_5$ denotes phenylene,

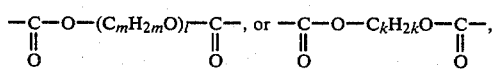

m being an integer of 2 to 3, l being an integer of 2 to 5, and k being an integer of 2 to 6;
the proportions of components [A] and [B] satisfying the conditions:
[A]+[B]=100% by weight
[A]≧20% by weight
and said resin composition having a glass transition temperature of at least 85° C.

2. The expandable vinylidene chloride-based resin particles of claim 1, wherein said proportions of the tetrahydrofuran-soluble component [A] and the tetrahydrofuran-insoluble component [B] satisfy the conditions:
[A]+[B]=100% by weight
20% by weight≦[A]≦90% by weight.

3. The expandable vinylidene chloride-based resin particles of claim 1, wherein said non-crystalline vinylidene chloride-based resin composition has a glass transition temperature of at least 85° C. and a limiting oxygen index of at least 24%.

4. The expandable vinylidene chloride-based resin particles of claim 1, wherein said non-crystalline vinylidene chloride-based resin composition exhibits an elongation exceeding 200% in the temperature range of from the glass transition temperature (Tg) of the resin composition to (Tg+50)°C.

5. The expandable vinylidene chloride-based resin particles of claim 1 which have particle diameters in the range of 0.1 to 1 mm.

6. The expandable vinylidene chloride-based resin particles of claim 1, wherein said tetrahydrofuran-soluble component [A] is constituted of units of the general formulae (a), (b), and (c) in proportions of 30–70 mole %, 1–10 mole %, and 25–70 mole %, respectively, and said tetrahydrofran-insoluble component [B] is constituted of unit of general formulae (a), (b), (c), and (d) in proportions of 25–65 mole %, 1–10 mole %, 25–70 mole %, and 0.01–0.2 mole %, respectively.

7. The expandable vinylidene chloride-based resin particles of claim 1, wherein said constitutional unit (c) is composed of randomizedly bonded acrylonitrile and styrene.

8. The expandable vinylidene chloride-based resin particles of claim 1, wherein said volatile organic blowing agent has a lower boiling point than the glass transition temperature of the non-crystalline vinylidene chloride-based resin composition.

9. The expandable vinylidene chloride-based resin particles of claim 1, wherein said volatile organic blowing agent has a mole-average solubility parameter of 5.7 to 9.7.

10. A heat resistant molded vinylidene chloride-based resin foam constructed of numerous multicellular expanded particles which comprise a non-crystalline vinylidene chloride-based resin composition consisting of
a tetrahydrofuran-soluble component [A] which is a random copolymer constituted of different units represented severally by the general formulae (a), (b), and (c) and has a weight-average molecular weight of 10,000 to 600,000 and
a tetrahydrofuran-insoluble component [B] which is a random copolymer constituted of different units represented severally by the general formulae (a), (b), (c), and (d),
the proportions of components [A] and [B] statisfying the conditions:
[A]+[B]=100% by weight
[A]20% by weight,
said resin composition having a glass transition temperature of at least 85° C.,
and said multicellular expanded particles being fused together and in intimate contact with neighboring particles of them.

11. The molded vinylidene chloride-based resin foam of claim 10, wherein said proportions of the tetrahydrofuran-soluble component [A] and the tetrahydrofuran-insoluble component [B] satisfy the conditions:
[A]+[B]=100% by weight
20% by weight [A] 90% by weight.

12. The molded vinylidene chloride-based resin foam of claim 10, wherein said non-crystalline vinylidene chloride-based resin composition has a glass transition temperature of at least 85° C. and a limiting oxygen index of at leat 24%.

13. The molded vinylidene chloride-based resin foam of claim 10, which has a density of 15–300 kg/m³.

14. The molded vinylidene chloride-based resin foam of claim 10, wherein the proportion of closed cells in said multicellular expanded particles is at least 60%.

15. The molded vinylidene chloride-based resin foam of claim 10, the percentage volume change of which on heating at 70° C. does not exceed 5%.

16. The molded vinylidene chloride-based resin foam of claim 10, wherein said tetrahydrofuran-soluble component [A] is constituted of units of the general formulae (a), (b), and (c) in proportions of 30–70 mole %, 1–10 mole %, and 25–70 mole %, respectively, and said tetrahydrofuran-insoluble component [B] is constituted of units of the general formulae (a), (b), (c), and (d) in proportions of 25–65 mole %, 1–10 mole %, 25–70 mole %, and 0.01–0.2 mole %, respectively.

17. The molded vinylidene chloride-based resin foam of claim 10, wherein the constitutional unit (c) is a composed of randomizedly bonded acrylonitrile and styrene.

* * * * *